United States Patent [19]

Wunderley

[11] Patent Number: 4,848,250
[45] Date of Patent: Jul. 18, 1989

[54] REFUSE CONVERTER

[76] Inventor: John M. Wunderley, 200 Wunderley Dr., McKeesport, Pa. 15133

[21] Appl. No.: 236,146

[22] Filed: Aug. 25, 1988

[51] Int. Cl.$^4$ ............................................. F23M 5/06
[52] U.S. Cl. .................................... 110/235; 110/214; 110/344
[58] Field of Search ............... 110/203, 208, 210, 211, 110/214, 233, 235, 250, 229, 230, 251, 253, 254, 255, 256, 257, 259, 301, 302, 304, 315, 316, 346

[56] References Cited

U.S. PATENT DOCUMENTS

| | | | |
|---|---|---|---|
| 3,481,290 | 12/1969 | Wunderley | 110/259 |
| 3,744,438 | 7/1973 | Southwick | 110/250 X |
| 3,747,542 | 7/1973 | Ruohola et al. | 110/214 |
| 3,918,374 | 11/1975 | Yamamoto et al. | 110/250 X |
| 4,280,417 | 7/1981 | Alexandersson | 110/346 |
| 4,574,714 | 3/1986 | Bach et al. | 110/346 |
| 4,655,968 | 4/1987 | Quieser et al. | 110/250 X |
| 4,667,609 | 5/1987 | Hardison et al. | 110/346 X |
| 4,718,362 | 1/1988 | Santen et al. | 110/346 |

*Primary Examiner*—Edward G. Favors
*Attorney, Agent, or Firm*—William J. Ruano

[57] ABSTRACT

Apparatus and method for converting refuse to thermal energy, metal, and slag devoid of particulate matter. The refuse is injected into an ignition chamber to ignite readily burnable material. The unburnable material is past to a primary chamber wherein it is exposed to a molten metal bath and to pure oxygen to reduce the unburnable material to metal and slag. Water in the refuse reacts with carbon to produce hydrogen gas. This gas is passed to a secondary chamber wherein the hydrogen is burnt, resulting in an increase in temperature to above 3000° F. and producing water. Because of this high temperature the water disassociates into hydrogen and oxygen. The hydrogen burns repeatedly and forms water and hydrogen in rapid succession generating thermal energy devoid of particulate material. The method and apparatus are also suitable for burning coal instead of refuse.

6 Claims, 2 Drawing Sheets

REFUSE CONVERTER

This invention relates to a refuse converter and is an improvement over that covered by U.S. Pat. No. 3,481,290 dated Dec. 20, 1969. It is also useful as a coal converter.

BACKGROUND OF THE INVENTION

Refuse incinerators of the past have not been efficient or capable of complete incineration of refuse without fly ash. Such incinerators have been operated at temperatures less than 2000 degrees F. and have been incapable of exceeding such temperatures since the conventional grates used therein would soon burn up. Moreover, they have operated basically in a single burning step, therefore efficiency in burning has not been attainable.

SUMMARY OF THE INVENTION

An object of the present invention is to provide a novel apparatus and method which overcomes the above-mentioned disadvantages by providing apparatus devoid of grates and by employing five separate chambers, instead of one, for enabling five different steps in the method to enable raising the temperature to in excess of 3000 degrees F. and thereby completely eliminate the conventional fly ash end product of conventional incinerators and make possible complete incineration of refuse to a degree heretofore impossible of attainment.

DETAILED DESCRIPTION OF THE DRAWINGS

Figure 1:
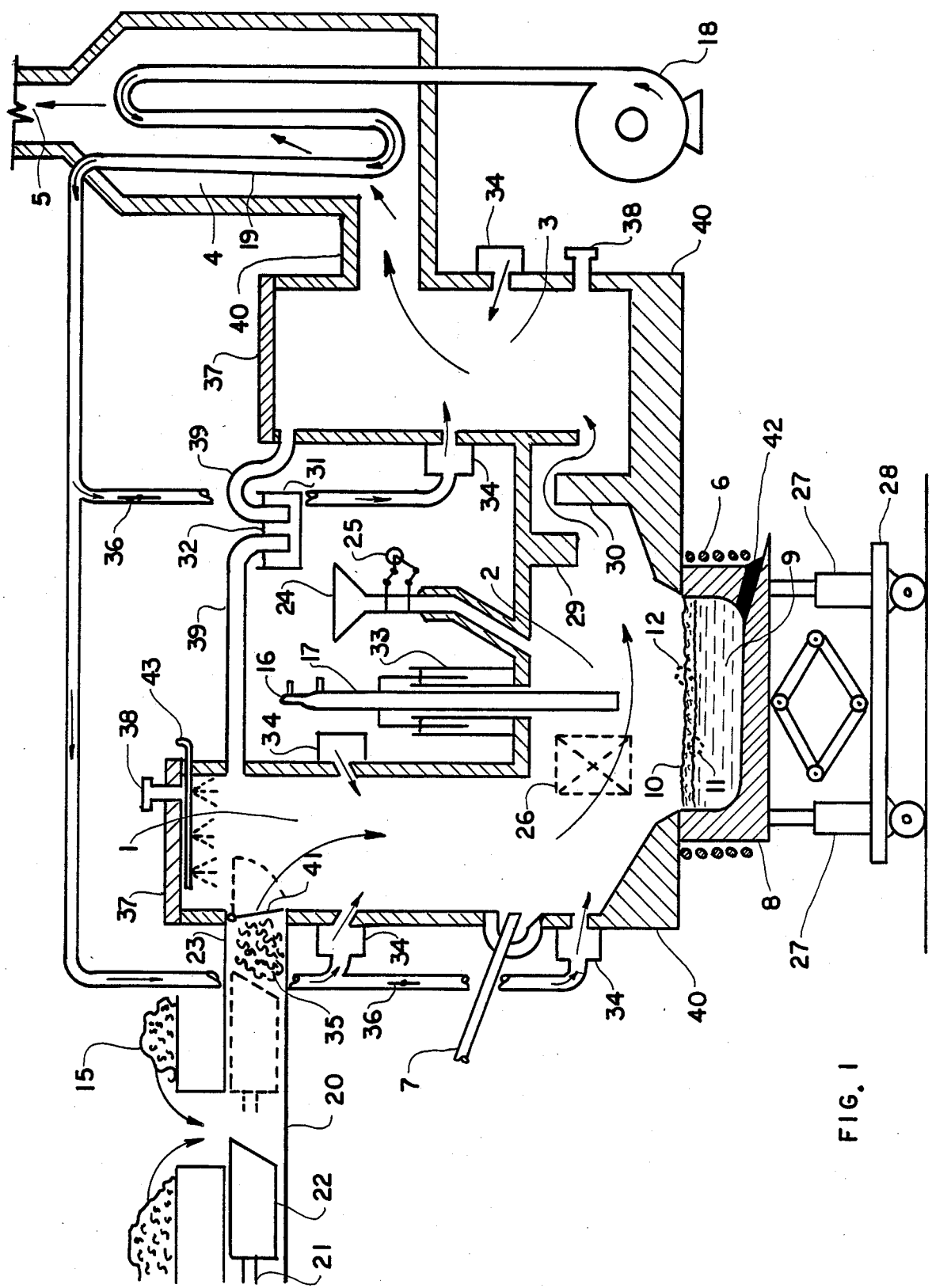
Figure 3:
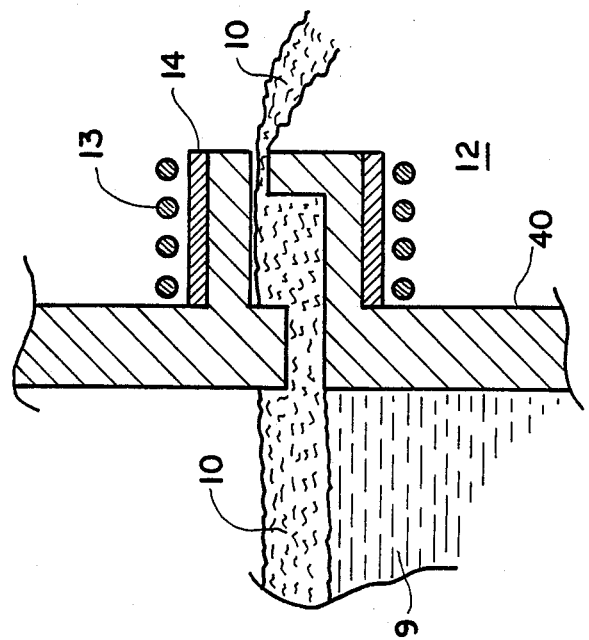
Figure 2:
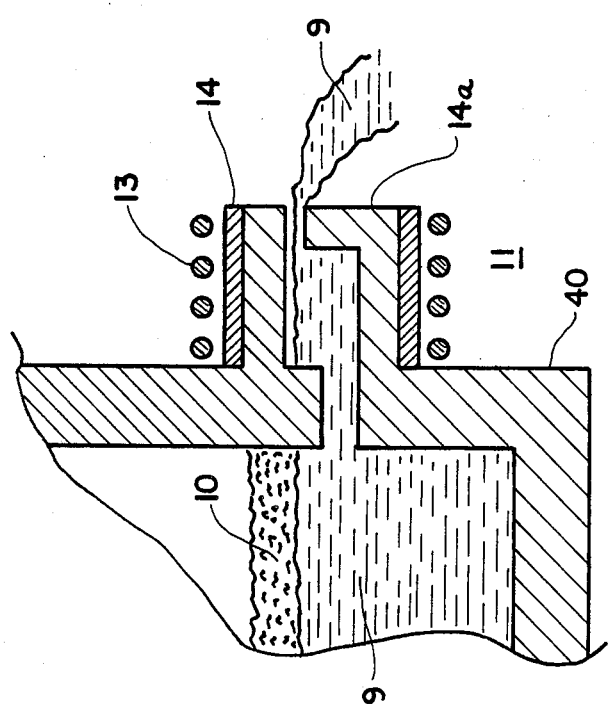

FIG. 1 is a vertical cross-sectional view of a refuse converter comprising five basic sections in accordance with the present invention; and FIGS. 2 and 3 are enlarged, fragmentary cross-sections of portions of the apparatus shown in FIG. 1.

DETAILED DESCRIPTION OF THE PREFERRED EMBODIMENT

I. Apparatus

The refuse converter of the present invention comprises five basic sections: ignition chamber 1, primary chamber 2, secondary chamber 3, heat exchanger chamber 4 and gas cleaning chamber 5. A major part of equipment is the electric induction coil 6 used at the base of the ignition chamber and primary chamber. The main function is for start-up pre-heating and melting of metals along with the function of acting as an auxiliary source of heat during operation if and when required.

The present converter does not use mechanical or any other form of grates. This is a very distinct difference between conventional incinerators which use grates and the Wunderley converter of the present invention. The temperatures are too excessive and would melt any form of grates known. Although the present converter does not require any form of additional fuel for normal operation, there may or may not be provisions for gas or oil injection 7 for drying of the converter after construction, pre-heating, and/or an auxiliary heat system if or when required.

At the bottom of the ignition and primary chamber is a ladle type reservoir 8 for molten metal 9 and slag 10. The design of the run-off spouts 11 and 12 is so constructed as to permit not only separation of metal and slag by gravity, but also to provide a continuous flow of each material into separate molds, pits, or other suitable receptacle. Electrical induction coils 13 are used (FIGS. 2-3) along with electrical conducting material 14, such as graphite, in the run-off spout and around the exit holes for molten metal and slag. The area is maintained at the desired temperature by the electrical induction system to maintain a steady and even flow of molten material from the converter. Although the present converter does not require any preparation of refuse 15, it can be used with existing equipment, such as shredders, separators, and moisture control equipment 43.

The equipmemt of the present invention is practically unlimited in size and magnitude at which the present converter can operate. The design is flexible as to physical size, tons per hour, etc. The equipment is extremely versatile in that it can take such items as tires, washers, dryers, bicycles, refrigerators, etc. which are a serious problem with conventional incinerators.

A water cooled oxygen lance 17 is used to improve cobustion efficiency. The location, angle and position of the lance(s) is variable and can be used as desired. Pure oxygen (99.6%) 16 is used to create an atmosphere which sustains violent combustion at temperatures above 3000 degrees F. Oxygen can be injected by means of the water cooled lance 17 from the top and/or oxygen enriched combustion air. A fan 18 or fans are used for combustion air with high velocity and high volume. The air is forced through a heat exchanger 19 and pre-heated to 1000 degrees F. and above. Fans not only supply combustion air but provide for internal converter pressures. The air is pre-heated by the process itself but can also be heated by an external system if so desired.

The raw material feeding system 20 is unique in that it is so designed to provide a continuous feed, or an intermittent feed. It also can be regulated as to piston speed by control of the hydraulic system 21. The unit consists of a double acting hydraulic piston feed which is power driven in both directions. The plunger head 22 and chute 23 are square which facilitates the loading of refuse and seals the chute against gas and pressure leakage from the converter. The design of the plunger feeding system is based on the foot pounds of pressure required, area and shape of chute, coefficient of friction, length of stroke, etc.

The equipment is used as a recycling system in that it produces useful by-products. These by-products are metal ingots and a very hard abrasive substance which have many possibilities without the production of flyash. A secondary fan (or an offtake from the primary fan 18) is used to inject heated, secondary combustion air/oxygen/oxgen enriched combustion air. Provisions are made for the addition of fluxing material 24 into the molten metal and slag in the area of the ignition chamber and primary chamber. This is done by the use of rotary valve type 25 or flop gate type of air locks. An access door 26(or doors) is used in the area of the ignition chamber and primary chamber for direct metal injection for initial start-up, also for maintenance and inspection purposes.

Installing and removing of the molten metal crucible for maintenance is accomplished by a hydraulic lift system 27 mounted on a dolly 28 for ease of handling. The secondary chamber is so designed as to retard the flow of gases and thus build up internal pressures. The baffle ring walls 29 and center walls 30 overlap, therefore determine the pressure by the number of walls and the amount of overlap.

Another pressure control device which is used is a water seal system 31 employed in the ignition chamber to maintain pressure at the desired level. This device also acts as a pressure release in the event of an abnormal pressure build up. Pressure is regulated by the height of the water 32. In addition to the ignition chamber, this system may also be used in the primary chamber and/or the secondary chamber by the use of flow ducts 39. The oxygen lance 17 is inserted in such a manner as to prevent escape of fire, heat, smoke, gases or pressures by use of a water seal 33. The water level is set at a predetermined height which overcomes the maximum internal pressure. Water is replenished and circulated in order to maintain proper level and also for cooling purposes. Oxygen and pre-heated air 34 can be used separately or mixed in proportions depending on type of materials 35 being incinerated and the burning rate desired. Preheated air is generally fed to the bottom area by low pressure and high volume. The entire air system is controlled by a series of damper valves 36 in the air distribution system which controls the flow to each area. Although most of the gases are burnt in the converter and though there is little or no visible smoke, the stack output is run through mechanical, electrical or wet scrubber type air cleaners.

The refuse feeding system is used to inject refuse into the incinerator at one or two or more places depending on size and demand factor. The design of the molten metal run-off spout and the molten slag run-off spout is such, by making outside lip 14a higher (FIG. 2) in elevation than lip 14b, that it produces a seal to block off the unit. This prevents any possible escape of unburnt gases or material. This design also maintains high internal pressures while continuously expelling the molten run-off material.

Provisions are made for access to the system for maintenance by use of removable covers 37 which are normally sealed to pressurize the system. At convenient locations throughout the system, observation peep holes 38 are used to visually see the internal performance of the converter. The bottom crucible has a tap hole 42 for draining the molten mass when or if required for maintenance purposes. The entire system is lined with a suitable refractory lining 40 which holds up to the extremely high temperatures and molten material. The interlocking door 41 is used during operation and shut down if and when required. It can be used for additional sealing purposes, along with many combinations of smoke chambers, rotary valves, etc.

II. Process

The present converter is a self-supporting process in that it operates at temperatures well above 3000 degrees F. continuously by releasing the BTU value of the raw material being converted. The process does not use any form of grates which require periodic cleaning and servicing. The introduction of metal grates limits the combustion temperature to under 2000 degrees F. which is too cold for complete thermal conversion.

An outstanding feature of the present process is the use of a molten bath of metal on the bottom of the ignition chamber and primary chamber. This molten mass acts as a "flywheel" and keeps the system on a very steady and stable combustion process. All burnable material is quickly and efficiently incinerated along with the more stubborn materials such as damp and wet paper, green plant and tree wastes, wet garbage, such as food remains, meats, fish, etc.

The present process uses five steps of conversion:

Step 1: Ignition chamber. The readily burnable materials such as paper, wood, rubber, plastics, etc. are ignited by the high temperature combustion air which is above 1000 degrees F. The material enters the ignition chamber 1 from the top and falls through the ignition system which also separates the material as it falls and creates a violent flammable condition.

Step 2: Primary Chamber 2. After ignition, the primary burn takes place, which increases the temperature to incinerate the more stubborn items such as some types of plastic, glass, etc. The molten "flywheel" of metal and slag ignites these remaining items and melts the metals and high temperature glass. Also in this area are the molten run-off spouts which separate the metals, glass, slag, etc. This area also includes the water cooled oxygen lance. The purpose of the oxygen lance 17 is to inject oxygen into the molten metal which creates a violent reaction. This reaction sends the molten metal to temperatures in excess of 3000 degrees F. This principle readily ignites and incinerates any material which has not, as yet, ignited. This principle also melts down any metals, glass and masonary material, etc. and is run off as molten metal or molten slag.

Step 3: Secondary chamber. After the primary burn, the remaining gases are now mixed with heated, fresh combustion air and/or oxygen to burn off any remaining material or gas. This produces an extremely high temperature flame (above 3000 degree F.). This secondary burn completely reduces all particulate matter that wasn't converted in the primary chamber.

Step 4: Heat exchanger chamber. Recycling of heat by heat recovery is accomplished by the use of heat exchangers 4. Combustion air is heated in this area along with excess heat being used for steam and thus electrical power generation and other uses.

Step 5: Gas cleaning system. Although this method of incineration is very efficient and burns or runs off practically all material, a gas cleaning system is employed to remove any minute particles which may be left.

Another outstanding feature of this process is the use of an electric induction coil 6 for starting the unit by melting the metal mass at the bottom of the ignition chamber and primary chamber. The induction coil is also used for "holding" purposes if or when the process is shut down temporarily or over night. It may also be used as a booster if necessary, in order to build up temperature.

Violent reaction that occurs in the primary chamber 2 is the production and combustion of hydrogen gas. In order to produce the hydrogen, the present converter is equipped with a water injection system 43. Once the operatiog temperature reaches 2000 degrees F. after the initial startup, water is injected with the refuse. A chemical reaction between the water and the carbon in the refuse at this temperature spontaneously produces hydrogen. The hydrogen is then burnt which causes 1. the operating temperature to exceed 3000 degrees F. 2. the secondary burn to eliminate particulate matter, and 3. the recovery of thermal energy.

The burning of the hydrogen also produces another combustion phenomenon. The oxidized hydrogen forms water as its sole combustion product. At the high temperatures associated with the present converter, the water is dissociated. In other words, hydrogen and oxygen are again formed and the process is repeated. This spontaneous occurrence is what keeps the operating temperature of the converter above 3000 degrees F.

The process is further enhanced by the use of a water cooled oxygen lance above the molten metal. The introduction of oxygen sends the temperature soaring in excess of 3000 degree F. due to the oxidation of the molten metal. Fresh, preheated air in excess of 1000 degrees F. is heated by the process itself and introduced as combustion air into the ignition chamber which ignites the raw material when introduced by means of a plunger feeding system. This injection is regulated such that a positive internal pressure is maintained within the converter.

The raw material feeding system is unique in that it can be used with or without a smoke chamber, interlocking doors, rotary valves, etc. The plunger feeding system is desiged on the principle of foot pounds of pressure required, area and shape of chute, coefficient of friction, length of stroke, etc. The main feature of the above is that it has a choice between continuous or intermittent feeding without loss of gases or pressure from the converter.

Metals are quickly and completely melted by this process and ran off by a continuous flow of molten metal at a rate dictatated by the rate at which metal is introduced. The so called unburnable items, such as rock, glass, concrete, etc. are melted at extremely high temperatures and are continuously run off by a steady flow of molten slag. The run off spout and exit holes for the molten metal and slag are kept at very high temperatures by use of electrical conducting material such as graphite, and heated by electrical induction coils. This method provides for steady flow of metal and slag without freezing.

The present process requires no preparation of the refuse, such as drying, separation, etc. Such process also handles the complete line of common residential and commercial trash and refuse without regard to separation or proportions of metal, glass, garbage, plastic, wood, paper, etc. More efficient combustion, however, can be achieved by injecting uniform and properly sized refuse. The process can readily take items, such as washers, dryers, tires and other items regardless of material make-up, such as metal, glass, wood, etc. The process is limited only by the physical size of the converter and can conceivably even take such items as automobiles if built large enough.

Unlike convention incinerators, this process does not depend on auxiliary fuel, such as gas or oil. Although the present converter does not require any form of additional fuel for normal operation, the present process has the flexibiltiy of using gas or oil injection for preheating, and/or an auxiliary heat source if or when required. Fluxing material added to molten metal and slag helps to fluidize the metal and slag in order to run it off more easily.

The process described herein by means of the apparatus described herein may also be utilized for the combustion of coal at temperatures well above 3000° F. without the production of flyash, particulate matter and potentially hazardous combustion gases including hydrogen sulfide.

Thus it will be seen that I have provided a highly efficient apparatus and method for complete combustion of either refuse or coal so as to eliminate all end product particulate matter.

While I have illustrated and described several embodiments of my invention, it will be understood that these and modifications are contemplated in my invention and within the scope of the following claims.

I claim:

1. A five step conversion process to oxidize and melt both combustible and noncombustible refuse, generating thermal energy, alloy metal, slag and combustion gases devoid of particulate matter, comprising injecting the refuse into an ignition chamber to ignite combustible material and initiate oxidation of noncombustible refuse, injecting water into said ignition chamber, passing the material to a primary chamber wherein it is exposed to the exothermic oxidation of a molten mass by an oxygen lance which, in turn, reduces all noncombustible material to alloy metal or slag, whereby heat generated in part by iron oxidation and in part by heat content of refuse acts as a catalyst for injected water and carbon in the refuse to react and produce hydrogen, passing the combustion gas to a secondary chamber wherein said hydrogen is mixed and burnt through the introduction of combustion air, resulting in an operating temperature of about 4000° F. and the production of water, which water, because of the 4000° F. operating temperature, thermally dissociates into hydrogen and oxygen, the hydrogen oxidizing repeatedly and forming water repeatedly results in an energy redistribution which readily eliminates all particulate matter in the combustion gases, and generating thermal energy.

2. The process recited in claim 1 wherein said converter is maintained as a closed process in that all material introduced and removed including refuse, metal, slag, oxygen and air are regulated and controlled such as to operate at a pressure greater than ambient atmospheric pressure, whereby said positive operating pressure enhances the run-off of molten material.

3. The process recited in claim 1 wherein energy is added to the refuse conversion process by the exothermic reaction which occurs during the oxidation of iron.

4. The process recited in claim 1 whereby the location of the initial oxidation of the water gas is controlled and regulated through oxygen introduction by either the lance or combustion air to the secondary chamber without having to collect said hydrogen by removing it from the unit and returning it to a proper location at a condition which will support combustion.

5. Apparatus for converting refuse through thermal oxidation, comprising:
   (a) an ignition chamber wherein said refuse and heated air of about 1000 degrees F. is introduced to begin oxidation of said refuse, and in which ignition chamber an injection system for water is provided and, towards the bottom of said chamber, an area is provided for the production of hydrogen gas through a chemical reaction between water from said injecting system and carbon in said refuse,
   (b) a primary chamber containing means for providing a thermal flywheel effect comprising a molten metal bath, an oxygen lance projecting into said primary chamber to introduce oxygen above said molten metal bath to both provide heat through exothermic oxidation efficiency and provide a suitable area wherein the temperature can reach 4000 degrees F. to initiate the oxidation-dissociation process to follow,
   (c) a secondary chamber, connected to said primary chamber through baffles which regulate the flow speed and pressure of the combustion gases, wherein said secondary chamber an oxidation dissociation process occurs which results in an energy redistribution which produces combustion gases devoid of particulate matter, (d) a heat exchanger connected to the outlet of said secondary chamber for the recovery of thermal energy, whereby said heat exchanger chamber is positioned such that said recovery of thermal energy can capitalize on the high temperatures associated with said energy redistribution, and (e) a gas cleaning chamber connected to the outlet of said heat exchanger chamber.

6. Apparatus as recited in claim 5 for converting coal, instead of refuse, through thermal oxidation.

* * * * *